(12) United States Patent
Hsu

(10) Patent No.: US 12,507,775 B2
(45) Date of Patent: Dec. 30, 2025

(54) PROTECTIVE CASE SUITABLE FOR ELECTRONIC DEVICES OF VARIOUS SIZES

(71) Applicant: InnoCare Optoelectronics Corporation, Tainan (TW)

(72) Inventor: Chao-Chun Hsu, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 210 days.

(21) Appl. No.: 18/460,710

(22) Filed: Sep. 5, 2023

(65) Prior Publication Data
US 2024/0122319 A1   Apr. 18, 2024

(30) Foreign Application Priority Data
Oct. 13, 2022   (TW) .................................. 111138753

(51) Int. Cl.
A45C 11/00   (2006.01)

(52) U.S. Cl.
CPC ............. *A45C 11/00* (2013.01); *A45C 11/002* (2025.01); *A45C 11/003* (2025.01)

(58) Field of Classification Search
CPC ..... A45C 11/00; A45C 11/002; A45C 11/003; H05K 7/1404; G06F 1/16; B65D 25/10; B65D 25/06; B65D 25/101
USPC ....... 206/320, 305, 557, 560, 449, 454, 566, 206/370; 220/544, 530
See application file for complete search history.

(56) References Cited

U.S. PATENT DOCUMENTS

| | | | | |
|---|---|---|---|---|
| 1,684,925 A | * | 9/1928 | Perlmutter | F21V 21/06 248/346.07 |
| 5,447,234 A | * | 9/1995 | Faulstick | B65D 25/10 206/455 |
| 5,681,539 A | * | 10/1997 | Riley | A61B 50/22 206/370 |
| 5,685,429 A | * | 11/1997 | Myers | B65D 25/06 206/455 |
| 6,331,280 B1 | * | 12/2001 | Wood | A61L 2/26 206/268 |
| 7,395,933 B2 | * | 7/2008 | Ruth | G01R 31/2893 206/724 |
| 7,916,499 B2 | * | 3/2011 | Feng | H05K 13/0069 361/801 |
| 8,267,246 B2 | * | 9/2012 | Bettenhausen | A61B 50/30 206/439 |
| 8,861,208 B2 | * | 10/2014 | Hwang | H05K 7/142 361/752 |
| 9,346,608 B2 | * | 5/2016 | Sublett | B27B 17/00 |
| 10,098,480 B1 | * | 10/2018 | DeLuca | A45C 7/00 |
| 10,688,650 B2 | * | 6/2020 | Feaver | B25H 3/02 |

(Continued)

FOREIGN PATENT DOCUMENTS

| | | |
|---|---|---|
| CN | 103016915 | 4/2013 |
| CN | 112230721 | 1/2021 |

*Primary Examiner* — Chun Hoi Cheung
(74) *Attorney, Agent, or Firm* — JCIPRNET

(57) ABSTRACT

A protective case which is suitable for electronic devices of various sizes includes a bottom case and a positioning element. The bottom case is configured to accommodate an electronic device. The bottom case includes a plurality grooves, and each of the grooves includes a plurality of positioning holes. The positioning element is fixed to one of the positioning holes according to the size of the electronic device.

18 Claims, 10 Drawing Sheets

(56) References Cited

U.S. PATENT DOCUMENTS

| | | | |
|---|---|---|---|
| 11,419,364 B2* | 8/2022 | Slate | B65D 85/12 |
| 2005/0139499 A1* | 6/2005 | Flynn | B27B 17/00 |
| | | | 206/349 |
| 2014/0061069 A1* | 3/2014 | Westrup | G06F 1/1628 |
| | | | 206/37 |
| 2014/0262933 A1* | 9/2014 | Lockwood | A45C 11/00 |
| | | | 206/37 |
| 2015/0157103 A1* | 6/2015 | Simon | G06F 1/1632 |
| | | | 224/191 |
| 2016/0045003 A1* | 2/2016 | Chen | A45C 13/02 |
| | | | 224/247 |
| 2017/0099921 A1* | 4/2017 | Sirichai | A45C 11/00 |

* cited by examiner

PROTECTIVE CASE SUITABLE FOR ELECTRONIC DEVICES OF VARIOUS SIZES

CROSS-REFERENCE TO RELATED APPLICATION

This application claims the priority benefit of Taiwan application serial no. 111138753, filed on Oct. 13, 2022. The entirety of the above-mentioned patent application is hereby incorporated by reference herein and made a part of this specification.

BACKGROUND

Technical Field

The disclosure relates to a protective case, and in particular, relates to a protective case suitable for electronic devices of various sizes.

Description of Related Art

At present, some electronic devices are carried by a protective case (e.g., a tray). However, a single protective case can only carry electronic devices of the same size. Therefore, when it is necessary to carry electronic devices of various sizes, it is necessary to design protective cases of various sizes. As a result, a large amount of storage space is occupied, the cost of mold making also increases, and the materials cannot be simplified, which makes material management difficult.

SUMMARY

In the disclosure, a protective case which is suitable for electronic devices of various sizes includes a bottom case and a positioning element. The electronic device is disposed in the bottom case. The bottom case includes a plurality grooves, and each of the grooves includes a plurality of positioning holes. The positioning element is fixed to one of the positioning holes according to the size of the electronic device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
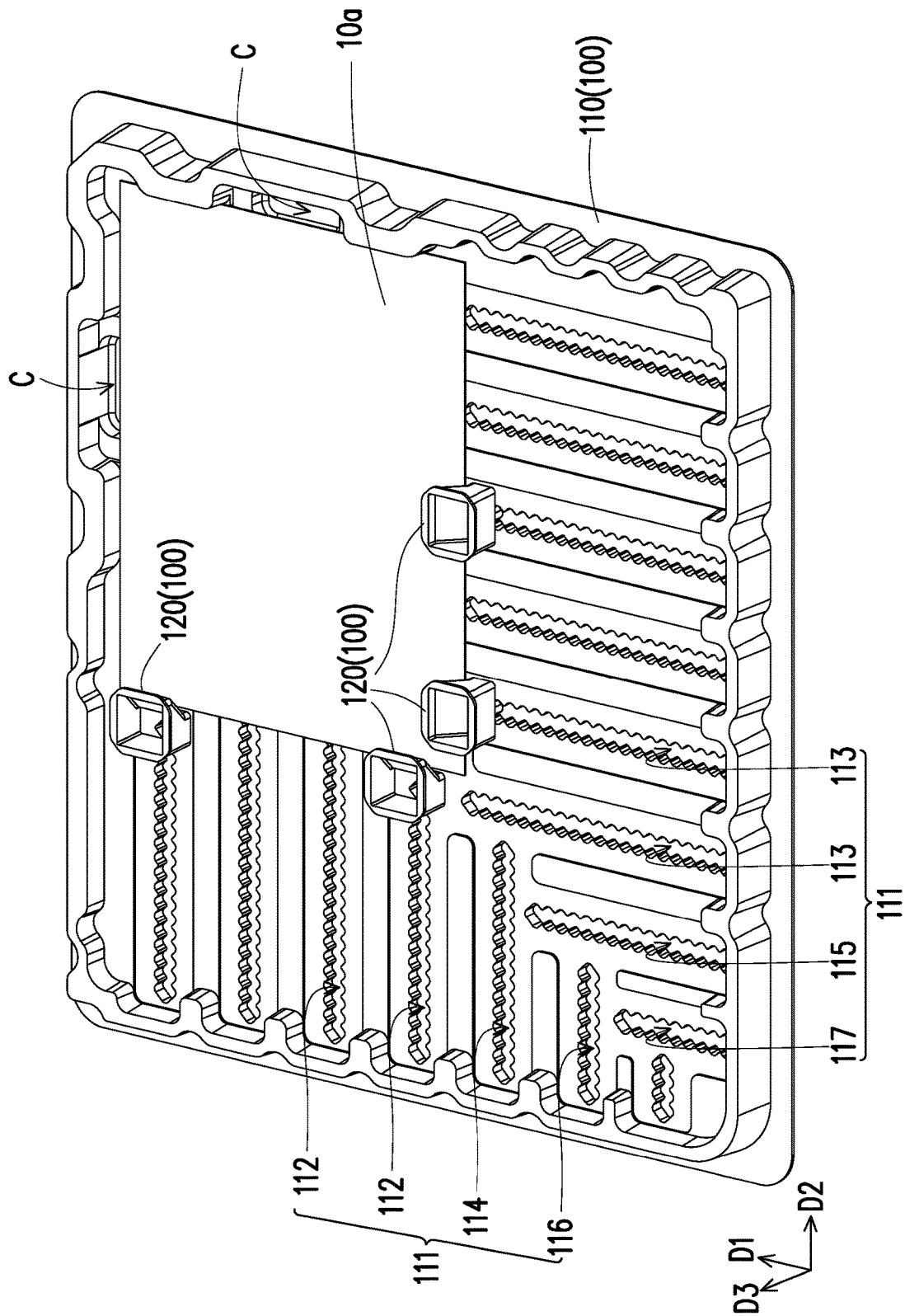
FIG. 1 is a three-dimensional schematic view of a protective case and an electronic device arranged on a bottom case of the protective case according to an embodiment of the disclosure.

The accompanying drawings are included together with the detailed description provided below to provide a further understanding of the disclosure. Note that in order to make the accompanying drawings to be more comprehensible to readers and for the sake of clarity of the accompanying drawings, only part of the electronic apparatus is depicted in the accompanying drawings of the disclosure, and specific elements in the drawings are not depicted according to actual scales. Moreover, the quantity and the size of each device in the drawings are only schematic and exemplary and are not intended to limit the scope of protection provided in the disclosure.

Throughout the specification and appended claims of the disclosure, certain terms are used to refer to specific elements. A person having ordinary skill in the art should understand that electronic apparatus manufacturers may refer to the same elements by different names. In the specification, it is not intended to distinguish between elements that have the same function but different names. In the following specification and claims, the words "including", "containing", and "having" are open-ended words and therefore should be interpreted as "containing but not limited to . . . ". Therefore, when the term "including", "containing", and "having" are used in the description of the disclosure, it specifies the existence of corresponding features, regions, steps, operations, and/or components, but does not exclude the existence of one or more corresponding features, regions, steps, operations, and/or components.

In the following embodiments, wording used to indicate directions, such as "up", "down", "front", "back", "left", and "right" merely refers to directions in the accompanying figures. Accordingly, the directional terminologies provided herein serve to describe rather than limiting the disclosure. In the accompanying drawings, common characteristics of the methods, structures, and/or materials used in specific embodiments are shown. However, the accompanying drawings should not be interpreted to define or limit the scopes or the properties of the descriptions in the embodiments. For instance, the relative size, thickness, and location of each film layer, region, and/or structure may be reduced or enlarged for clarity.

When a corresponding element (such as a film layer or a region) is referred to as being "disposed or formed on another element", the element may be directly disposed or formed on the other element or there may be another element between the two. On the other hand, when an element is referred to as being "directly disposed or formed on another element", there is no element between the two. Also, when an element is referred to as being "disposed or formed on another element", the two have a top-down relationship in the top view direction, and the element may be above or below the other element, and the top-down relationship depends on the orientation of the device.

It should be understood that when a component or a film layer is referred to as being "connected to" another component or film layer, the component may be directly connected to the other component or film layer, or there may be a component or a film layer inserted between the two. When a component is referred to as being "directly connected" to another component or film layer, there is no component or film layer inserted between the two. Also, when a component is referred to as being "coupled to another component (or a variation thereof)", the component may be directly connected to the other component or indirectly connected (such as electrically connected) to the other component through one or more components.

The terms "about", "equal to", "identical" or "same", "substantially", or "approximately" are generally interpreted as being within 20% of a given value or range or are interpreted as being within 10%, 5%, 3%, 2%, 1%, or 0.5% of a given value or range.

The ordinal numbers used in the specification and claims, such as "first", "second", etc., are used to modify the elements, and they do not imply or represent the (or these) elements have any previous ordinal numbers, do not represent the order of an element and another element, or the order of a manufacturing method. The use of these ordinal numbers is only used to clearly distinguish an element with a certain name from another element with the same name. The terms used in the claims and the specification may not have to be the same, and accordingly, the first component provided in the specification may be the second component in the claims.

It should be understood that the following embodiments may replace, reorganize, and mix the features in several different embodiments to complete other embodiments without departing from the spirit of the disclosure. As long as the features of the embodiments do not violate the spirit of the disclosure or conflict each other, they may be mixed and matched as desired.

In the disclosure, the electronic device may be a display device including, but not limited to, a light emitting element, a light source device, a backlight device, a sensing device, a splicing device, or a combination of the above functions. The electronic device may be a bendable or flexible electronic device. The electronic device may include, for example, liquid crystal and a light emitting diode, and the light emitting diode may include, but not limited to, for example, an organic light emitting diode (OLED), a sub-millimeter light emitting diode (mini LED), a micro light emitting diode (micro LED), a quantum dot (QD) light emitting diode (e.g., QLED or QDLED), fluorescence, phosphor, other suitable materials, or a combination of the foregoing. The sensing device may include an X-ray sensor. Hereinafter, the display device will be used as the electronic device or the splicing device to illustrate the disclosure, but not limited thereto. In addition, the electronic device may be applied to any electronic product or electronic device, such as but not limited to a television, a tablet computer, a notebook computer, a mobile phone, a camera, a wearable device, an electronic entertainment device, etc., but not limited thereto.

The same or similar reference numerals represent the same or similar components in the following exemplary embodiments, and repeated description thereof is thus omitted. In addition, the features of the embodiments may be mixed and matched arbitrarily as long as they do not violate or do not conflict with the spirit of the disclosure, and simple equivalent changes and modifications made according to the specification or claims are still within the scope of the disclosure. Words such as "first" and "second" in the specification or claims are used only to name discrete components or to distinguish different embodiments or scopes and should not be construed as the upper limit or lower limit of the number of any components and should not be construed to limit a manufacturing order or an arrangement order of the components.

Figure 2:
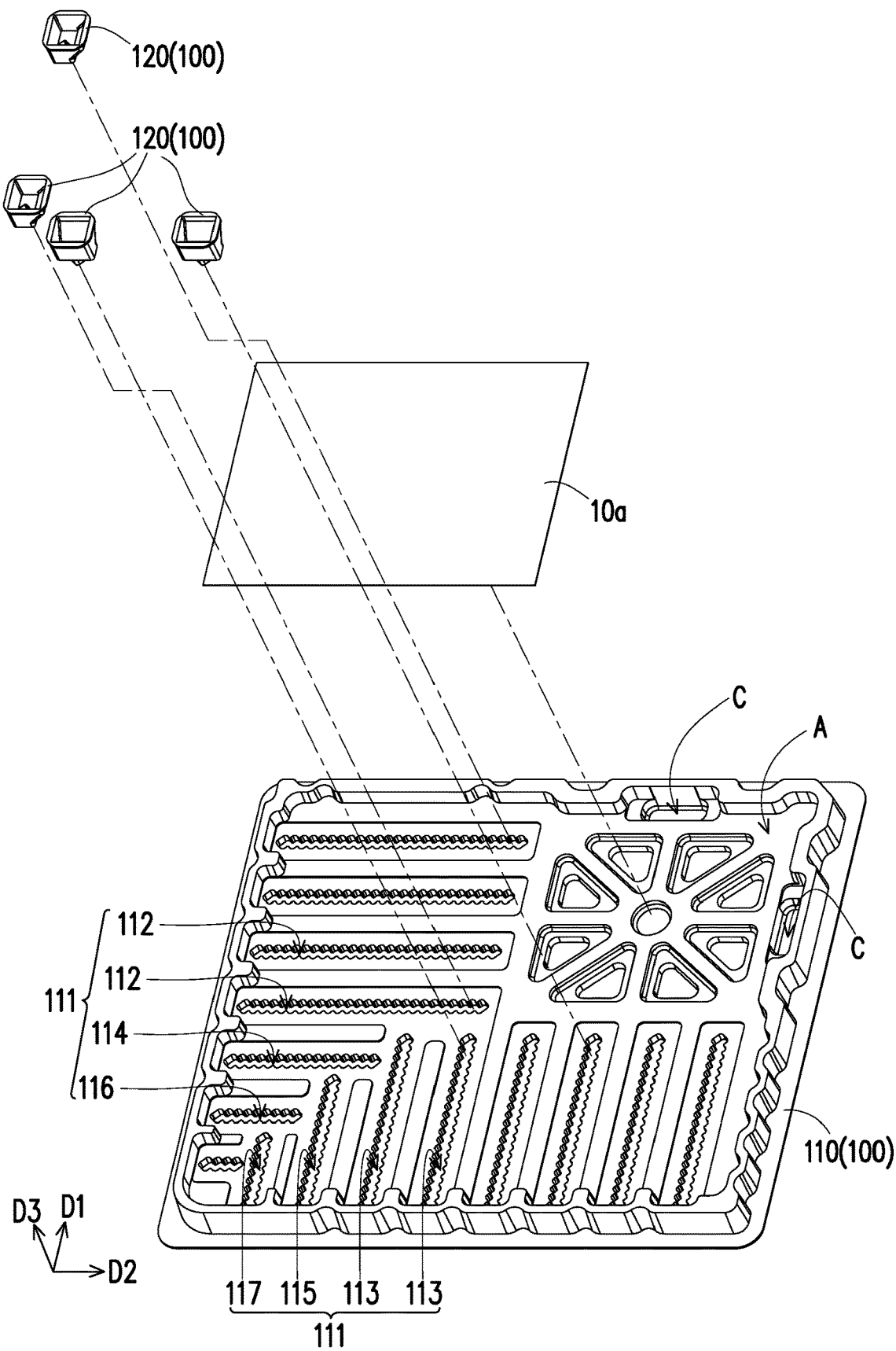
FIG. 2 is a three-dimensional exploded schematic view of FIG. 1.
Figure 3:
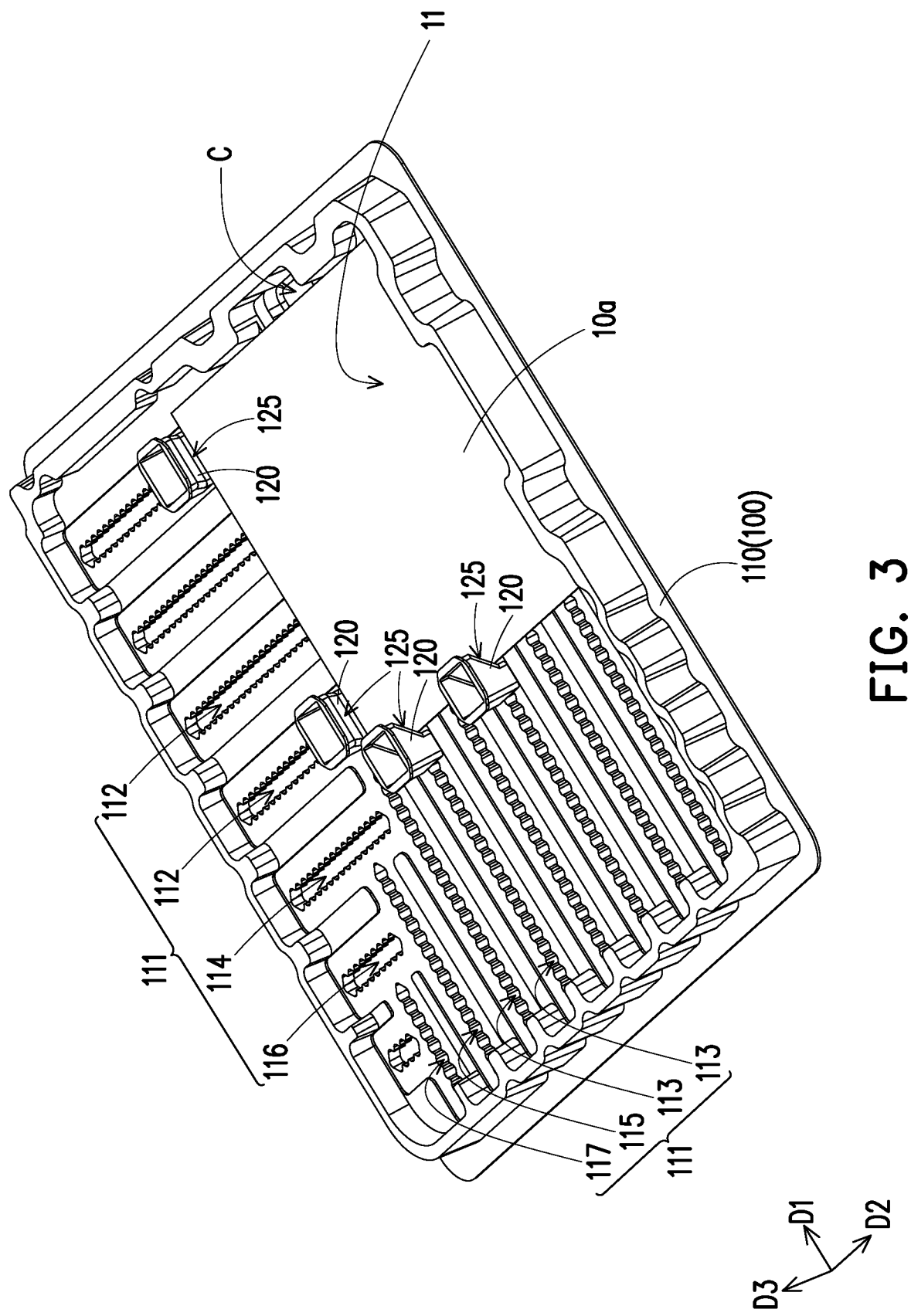
FIG. 3 is a three-dimensional schematic view of FIG. 1 from another viewing angle.
Figure 4:
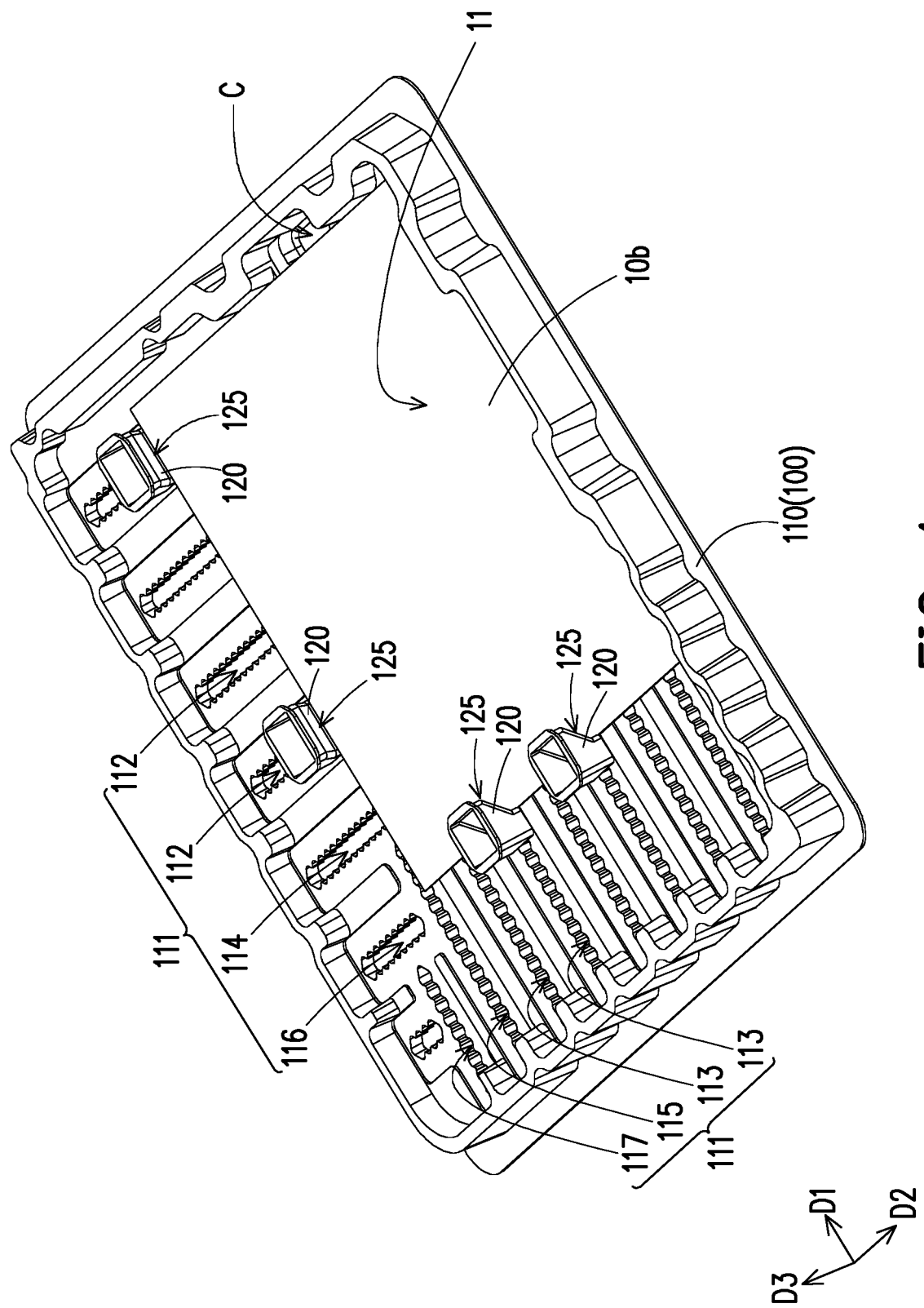
FIG. 4 is a three-dimensional schematic view of the protective case of FIG. 1 and an electronic device of another size.
Figure 5:
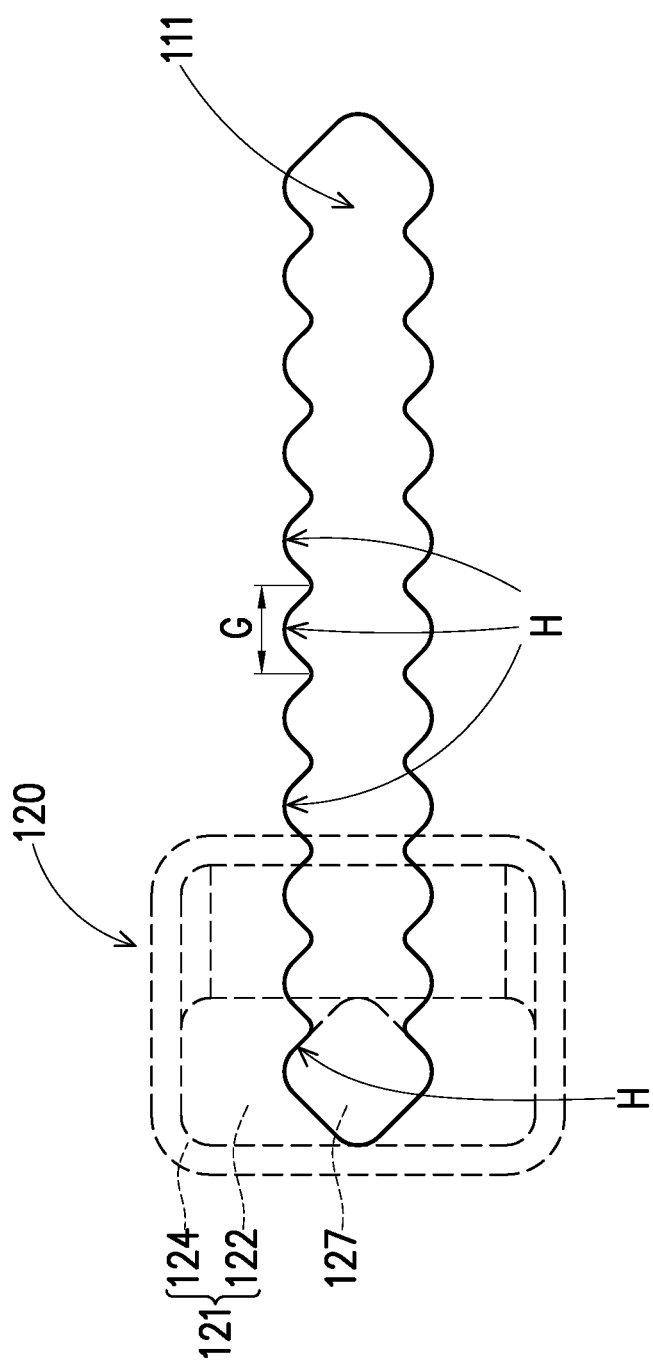
FIG. 5 is an enlarged top schematic view of a groove and a positioning element in FIG. 1.
Figure 6:
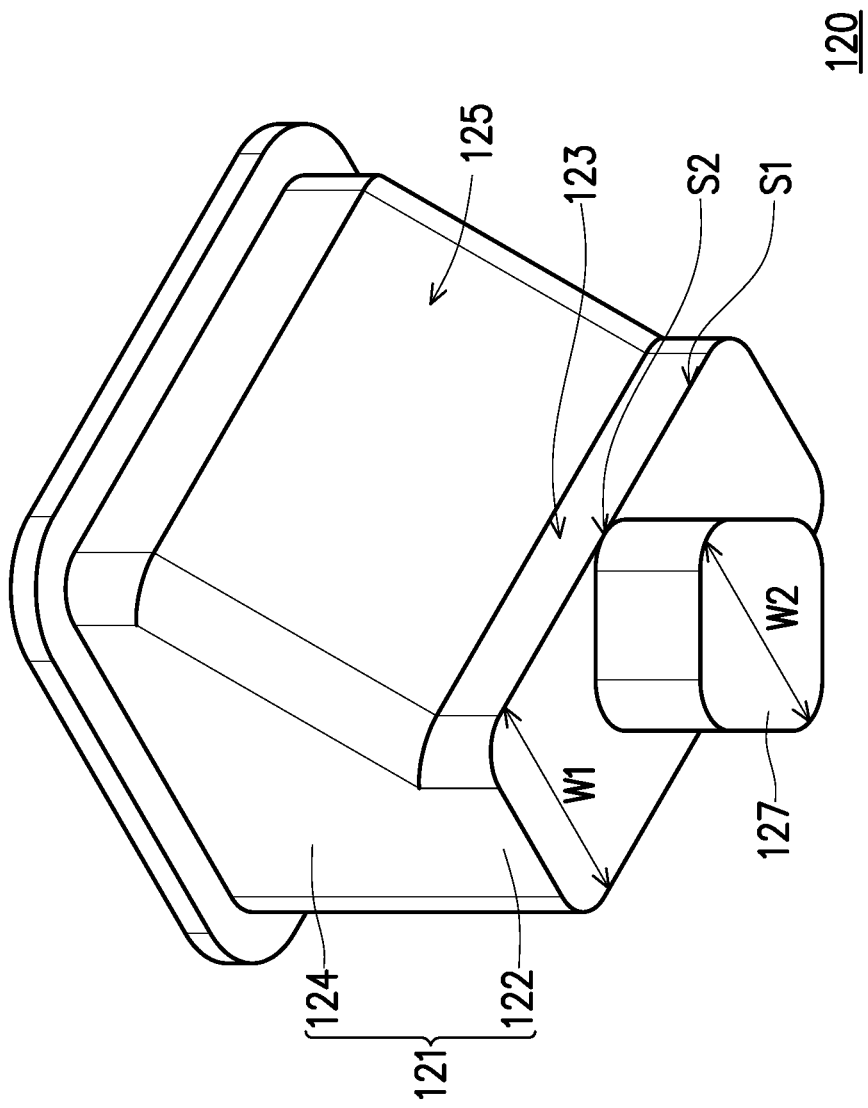
FIG. 6 is a three-dimensional schematic view of the positioning element of FIG. 1.
Figure 7:
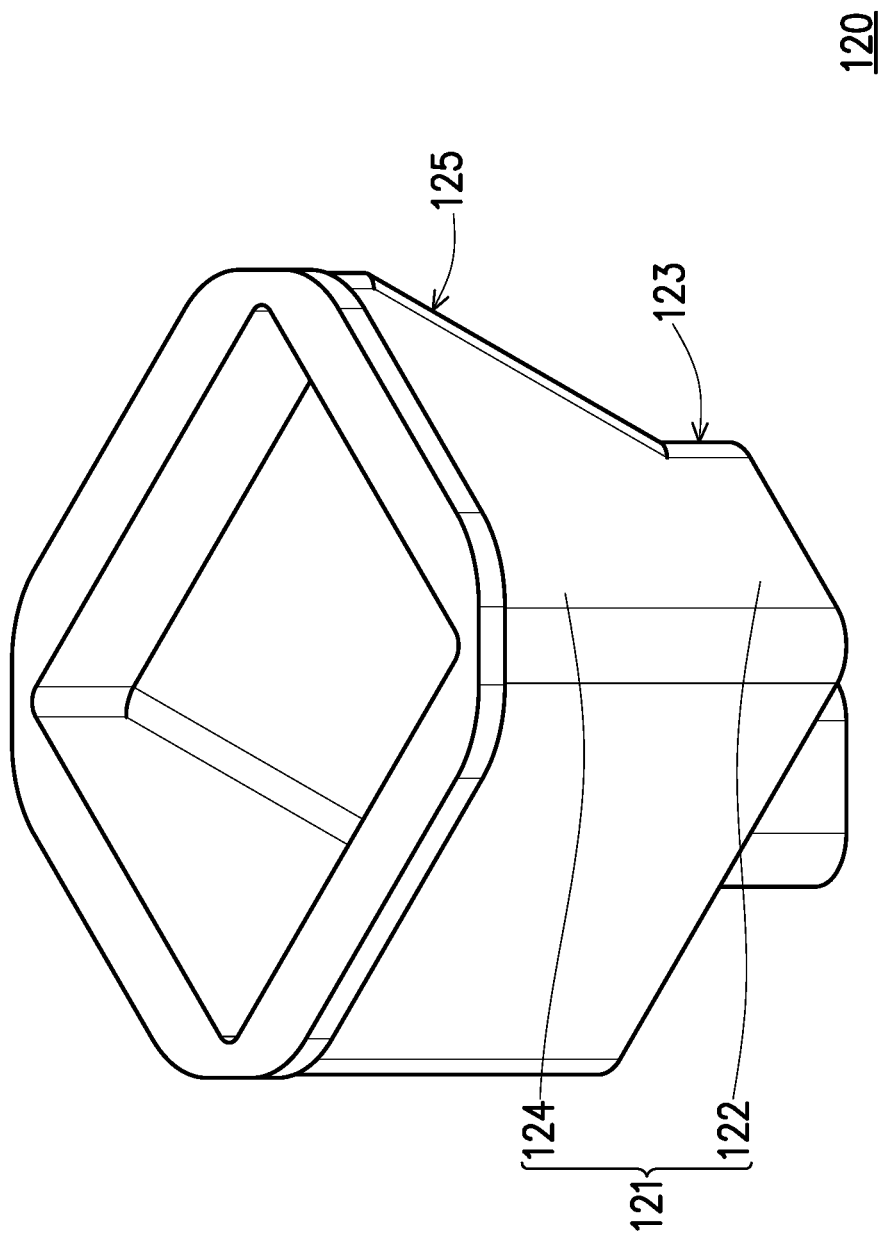
FIG. 7 is a three-dimensional schematic view of FIG. 6 from another viewing angle.
Figure 8:
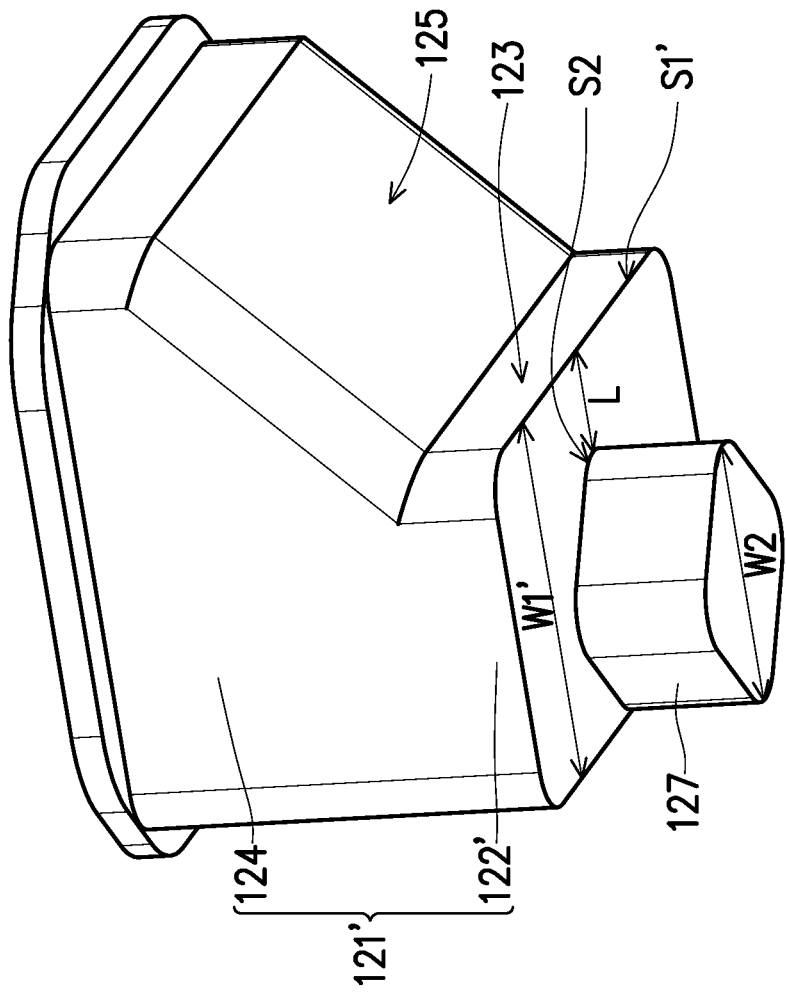
FIG. 8 is a three-dimensional schematic view of a positioning element according to another embodiment of the disclosure.
Figure 9:
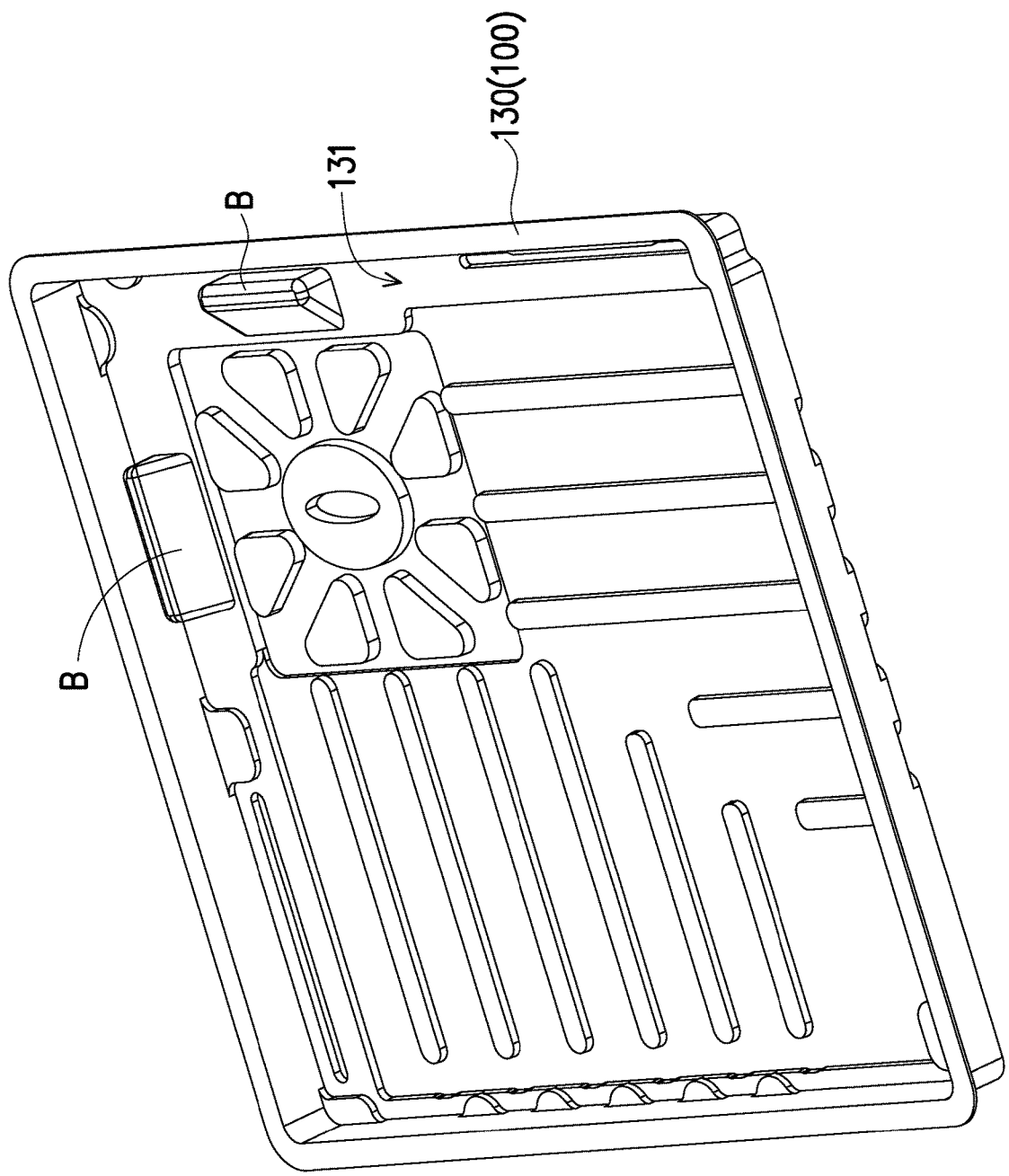
FIG. 9 is a three-dimensional schematic view of a top case of the protective case of FIG. 1.
Figure 10:
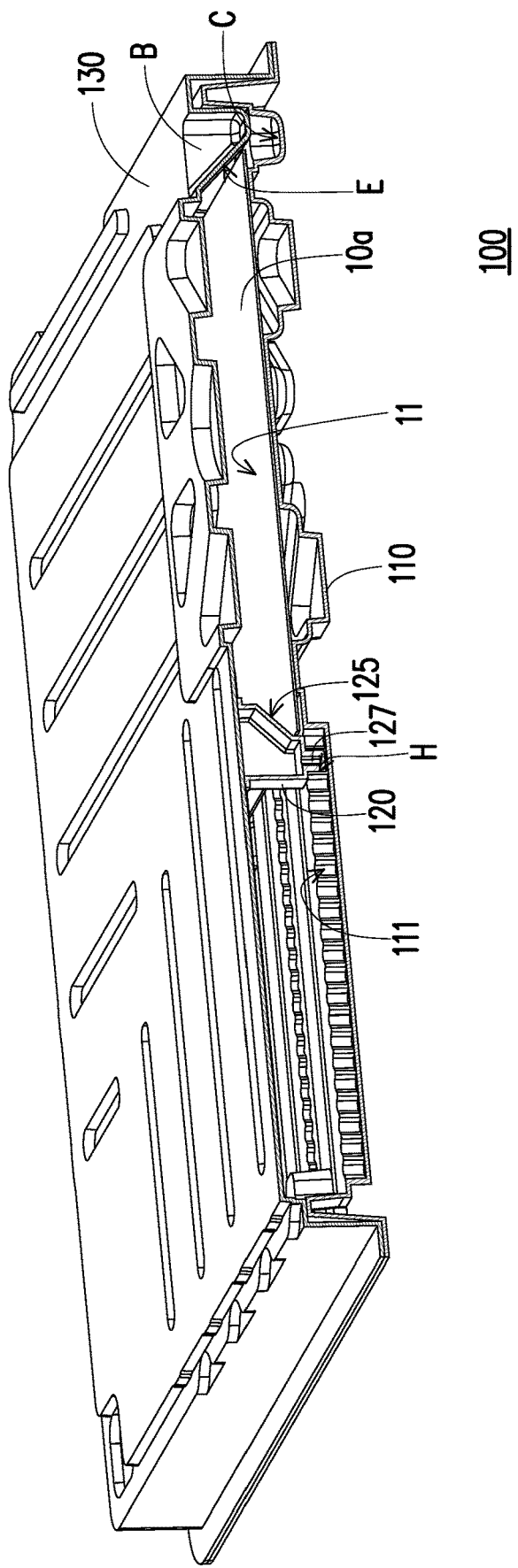
FIG. 10 is a three-dimensional cross-sectional schematic view of the protective case and the electronic device located in the protective case.

FIG. 1 is a three-dimensional schematic view of a protective case and an electronic device arranged on a bottom case of the protective case according to an embodiment of the disclosure. FIG. 2 is a three-dimensional exploded schematic view of FIG. 1. FIG. 3 is a three-dimensional schematic view of FIG. 1 from another viewing angle. FIG. 4 is a three-dimensional schematic view of the protective case of FIG. 1 and an electronic device of another size. FIG. 5 is an enlarged top schematic view of a groove and a positioning element in FIG. 1. FIG. 6 is a three-dimensional schematic view of the positioning element of FIG. 1. FIG. 7 is a three-dimensional schematic view of FIG. 6 from another viewing angle. FIG. 8 is a three-dimensional schematic view of a positioning element according to another embodiment of the disclosure. FIG. 9 is a three-dimensional schematic view of a top case of the protective case of FIG. 1. FIG. 10 is a three-dimensional cross-sectional schematic view of the protective case and the electronic device located in the protective case.

With reference to FIG. 1 and FIG. 5 together, in this embodiment, a protective case 100 includes a bottom case 110 and a plurality positioning elements 120. The bottom case 110 is configured to accommodate an electronic device 10*a*. The bottom case 110 includes a plurality grooves 111, and each of the grooves 111 includes a plurality of positioning holes H. Each of the positioning elements 120 is fixed to one of the positioning holes H according to a size of the electronic device 10*a*.

To be specific, with reference to FIG. 2, in this embodiment, the bottom case 110 has an arrangement region A, where the arrangement region A is located at a corner of the bottom case 110, and the grooves 111 may surround two sides of the arrangement region A, but not limited thereto. In other embodiments (not shown), the arrangement region A may be located in the middle of the bottom case 110. The electronic device 10*a* may be arranged in the arrangement region A of the bottom case 110, where an area of the electronic device 10*a* may be greater than an area of the arrangement region A. Further, in this embodiment, the grooves 111 may include a plurality first grooves 112, 114, and 116 and a plurality of second grooves 113, 115, and 117, but not limited thereto. An extending direction D1 of the first grooves 112, 114, and/or 116 may be perpendicular an extending direction D2 of the second grooves 113, 115, and/or 117. Herein, the first grooves 112, 114, and/or 116 may extend in the extending direction D1 and may be arranged at equal intervals, but not limited thereto. In other embodiments (not shown), the first grooves 112, 114, and/or 116 may not be arranged at equal intervals, for example. A length of the first groove 112 may be greater than a length of the first groove 114, and the length of the first groove 114 may be greater than a length of the first groove 116, which means that the first grooves 112, 114, and 116 may have various different lengths, but not limited thereto. Similarly, the second grooves 113, 115, and/or 117 may extend in the extending direction D2 and may be arranged at equal intervals, but not limited thereto. In other embodiments (not shown), the second grooves 113, 115, and/or 117 may not be arranged at equal intervals, for example. A length of the second groove 113 may be greater than a length of the second groove 115, and the length of the second groove 115 may be greater than a length of the second groove 117, which means that the second grooves 113, 115, and 117 may have various different lengths, but not limited thereto. Herein, the extending direction D1 may be, for example, an X direction, and the extending direction D2 may be, for example, a Y direction. In other embodiments (not shown), the extending direction D1 of the first grooves 112, 114, and/or 116 may not be perpendicular the extending direction D2 of the second grooves 113, 115, and/or 117.

Next, with reference to FIG. 2, FIG. 6, and FIG. 7 together, in this embodiment, each of the positioning elements 120 includes a main body portion 121 and a fixed portion 127 connected to the main body portion 121. The main body portion 121 includes a first portion 122 and a second portion 124, and the first portion 122 is connected between the fixed portion 127 and the second portion 124. In a normal direction D3 perpendicular to the bottom case 110, that is, the extending direction D1, a width W1 of the first portion 122 may be greater than or equal to a width W2 of the fixed portion 127. Herein, in the normal direction D3 perpendicular to the bottom case 110, an edge S1 of the first portion 122 may be aligned with an edge S2 of the fixed portion 127. That is, there is no distance between the edge S1 of the first portion 122 and the edge S2 of the fixed portion 127, which means the distance is 0. Further, the first portion 122 of the main body portion 121 includes a vertical surface 123, and the second portion 124 of the main body portion 121 includes an inclined surface 125, where the vertical surface 123 is connected to the inclined surface 125. In an embodiment, an area of the vertical surface 123 may be less than an area of the inclined surface 125, but not limited thereto. With reference to FIG. 3, the vertical surface 123 may be used for size adjustment of the electronic device 10a, and the inclined surface 125 may reduce the chance of the electronic device 10a being detached, so an upper surface 11 of the electronic device 10a may not easily touch the protective case 100. In this embodiment, the positioning element 120 is, for example, an integrally-formed positioning block, and includes, for example, plastic, ceramics, metal, other suitable materials, or a combination of the foregoing. A material of the positioning block includes, for example, polyethylene terephthalate (PET material), but not limited thereto. The positioning block has, for example, a hollow shape as shown in FIG. 7, but not limited thereto. In other embodiments (not shown), the positioning element 120 may not include a hollow shape, for example. In some embodiments, the positioning element 120 is a positioning block of a single-layer material, for example. In other embodiments (not shown), the positioning element 120 includes, for example, a positioning block made of various materials. Next, with reference to FIG. 3, FIG. 5, and FIG. 6 together, in this embodiment, the fixed portion 127 of the positioning element 120 may be fixed to one positioning hole H in one groove 111 of the bottom case 110 according to the size of the electronic device 10a. Since the positioning element 120 may have the vertical surface 123 for positioning as well as the inclined surface 125, the inclined surface 125 may reduce the chance of the electronic device 10a being detached. Therefore, the matching of the positioning element 120 and the positioning hole H may provide the function of size adjustment as well as the function of reducing the chance of a product (e.g., the electronic device 10a) being detached.

To be specific, a gap G is provided between two adjacent positioning holes H, and the gap G is greater than the distance (the distance is 0 herein) between the edge S1 of the first portion 122 and the edge S2 of the fixed portion 127. In another embodiment, with reference to FIG. 8, in the normal direction D3 perpendicular to the bottom case 110, that is, the extending direction D, a distance L is provided between an edge S1' of a first portion 122' of a main body portion 121' and the edge S2 of the fixed portion 127, and the gap G is greater than the distance L. In an embodiment, the gap G may be 6 mm, for example, and the distance L may be, but not limited to, between 1 mm and 5 mm, for example. That is, the distance L may be, but not limited to, 1 mm, 2 mm, 3 mm, 4 mm or 5 mm, for example. That is, in this embodiment, the positioning elements 120 and 120' may include various different distances L (e.g., 0, 1 mm, 2 mm, 3 mm, 4 mm or 5 mm). Through the gap G (e.g., 6 mm) between the positioning holes H together with the various different positioning elements 120 and 120', various changes may be adjusted (that is, the amount of change per 1 mm may be adjusted), but not limited thereto. In an embodiment, sizes of the gap G and the distance L may be individually adjusted according to needs. With reference to FIG. 3 and FIG. 4 together, when the size of an electronic device 10b is different from that of the electronic device 10a, by matching the positioning elements 120 and/or 120' with the positioning holes H, the function of size adjustment and the function of reducing detachment of the electronic device 10a and/or 10b are provided, so that the electronic devices 10a and/or 10b of different sizes may still share the same protective case 100. It should be noted that the amount of change per 1 mm may be adjusted herein, but not limited thereto. In other embodiments, as long as the gap G is greater than the distance L, the adjusted amount of change may be determined according to needs, and the amount of change is not limited to only 1 mm.

With reference to FIG. 2, FIG. 9, and FIG. 10 together, in this embodiment, the protective case 100 also includes a top case 130, and the top case 130 is assembled with the bottom case 110 to be configured to accommodate the electronic device 10a between the top case 130 and the bottom case 110. One of the top case 130 and the bottom case 110 includes limiting blocks B, the other of the top case 130 and the bottom case 110 includes limiting grooves C, and the limiting blocks B are arranged corresponding to the limiting grooves C. Herein, the top case 130 includes the limiting blocks B, and the bottom case 110 includes the limiting grooves C, but not limited thereto. In another embodiment (not shown), it is the top case 130 that includes the limiting grooves C and the bottom case 110 that includes the limiting blocks B. The limiting grooves C may be adjacent to the arrangement region A. The number of limiting grooves C and the number of limiting blocks B may be adjusted according to needs. In an embodiment, the limiting grooves C and the grooves 111 may be located on different sides of the arrangement region A, and the limiting blocks B may be arranged substantially corresponding to the limiting grooves C, so that the top case 130 and the bottom case 110 are assembled.

As shown in FIG. 1 and FIG. 10, both the inclined surface 125 of the positioning element 120 and the inclined surface E of the limiting block B face the electronic device 10a. The positioning elements 120 may be located on two sides of the electronic device 10a, and the limiting grooves C are located on the other two sides of the electronic device 10a. When the top case 130 and the bottom case 110 are assembled together, the limiting blocks B of the top case 130 may be disposed in the limiting grooves C of the bottom case 110, for example, so that the limiting blocks B may support the other two sides without the positioning elements 120. Herein, the upper surface 11 of the electronic device 10a may be, for example, untouchable. Through the inclined surfaces 125 of the positioning elements 120 and the inclined surfaces E of the limit blocks B, the chance of the electronic device 10a being detached is reduced, and the chance of the upper surface 11 of the electronic device 10a touching the protective case 100 is thus reduced.

In short, in this embodiment, through the matching of the positioning elements 120 and 120' and the positioning holes H, the function of size adjustment and/or the function of reducing detachment of the electronic devices 10a and 10b are provided, so the electronic devices 10a and 10b of different sizes may still share the same protective case 100. In this way, the types of protective cases may be reduced, and the use of storage spaces or mold-making costs may thus be lowered or material management may be simplified.

In view of the foregoing, in the design of the protective case provided by the disclosure, the bottom case includes multiple grooves, and each groove has multiple positioning holes. In this way, the positioning element may be fixed to one positioning hole of one groove of the bottom case according to the size of the electronic device, so as to fix the electronic device onto the bottom case. Therefore, electronic devices of different sizes may share the protective case provided by the disclosure, which means that the protective case provided by the disclosure exhibits high compatibility. As such, the types of protective cases may be reduced, so the use of storage spaces or mold-making costs may be lowered or material management may be simplified.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A protective case, which is suitable for electronic devices of various sizes, comprising:
   a bottom case configured to accommodate an electronic device, wherein the bottom case comprises a plurality grooves, and each of the grooves comprises a plurality of positioning holes; and
   a positioning element fixed to one of the positioning holes according to a size of the electronic device,
   wherein the positioning element comprises a main body portion and a fixed portion, the fixed portion is connected the main body portion, the main body portion comprises a first portion and a second portion, the first portion is connected between the fixed portion and the second portion, and in a normal direction perpendicular to the bottom case, a width of the first portion is greater than or equal to a width of the fixed portion, and a width of the second portion is greater than the width of the first portion;
   wherein the first portion comprises a vertical surface, the second portion comprises an inclined surface, and the vertical surface is connected to the inclined surface.

2. The protective case according to claim 1, wherein in the normal direction perpendicular to the bottom case, an edge of the first portion is aligned with an edge of the fixed portion.

3. The protective case according to claim 1, wherein in the normal direction perpendicular to the bottom case, a distance is provided between an edge of the first portion and an edge of the fixed portion.

4. The protective case according to claim 3, wherein the distance is between 1 mm and 5 mm.

5. The protective case according to claim 3, wherein a gap is provided between two adjacent positioning holes, and the gap is greater than the distance.

6. The protective case according to claim 1, wherein an area of the vertical surface is less than an area of the inclined surface.

7. The protective case according to claim 1, wherein the grooves comprise a plurality first grooves and a plurality of second grooves, and an extending direction of the first grooves is perpendicular an extending direction of the second grooves.

8. The protective case according to claim 1, further comprising:
   a top case assembled with the bottom case and configured to accommodate the electronic device between the top case and the bottom case.

9. The protective case according to claim 8, wherein one of the top case and the bottom case comprises a limiting block, the other of the top case and the bottom case comprises a limiting groove, and the limiting block is arranged corresponding to the limiting groove.

10. The protective case according to claim 1, wherein the bottom case has an arrangement region, the arrangement region is located at a corner of the bottom case, and the grooves surround two sides of the arrangement region.

11. The protective case according to claim 10, wherein the electronic device is arranged in the arrangement region of the bottom case, and an area of the electronic device is greater than an area of the arrangement region.

12. The protective case according to claim 1, wherein the bottom case has an arrangement region, the arrangement region is located in the middle of the bottom case.

13. The protective case according to claim 12, wherein the electronic device is arranged in the arrangement region of the bottom case, and an area of the electronic device is greater than an area of the arrangement region.

14. The protective case according to claim 1, wherein the positioning element is an integrally-formed positioning block.

15. The protective case according to claim 14, wherein the positioning block comprises a hollow shape.

16. The protective case according to claim 1, wherein the positioning element is a positioning block of a single-layer material.

17. The protective case according to claim 1, wherein the positioning element is a positioning block made of various materials.

18. The protective case according to claim 1, wherein a material of the positioning element comprises plastic, ceramics, metal, other suitable materials, or a combination of the foregoing.

* * * * *